(12) United States Patent
Danilin et al.

(10) Patent No.: US 8,952,976 B2
(45) Date of Patent: Feb. 10, 2015

(54) SIMD PARALLEL PROCESSOR ARCHITECTURE

(75) Inventors: Alexander Alexandrovich Danilin, Eindhoven (NL); Richard Petrus Kleihorst, Kasterlee (BE); Paul Wielage, Waalre (NL)

(73) Assignee: NXP B.V., Eindhoven (NL)

( * ) Notice: Subject to any disclaimer, the term of this patent is extended or adjusted under 35 U.S.C. 154(b) by 987 days.

(21) Appl. No.: 13/057,491

(22) PCT Filed: Aug. 5, 2009

(86) PCT No.: PCT/IB2009/053406
§ 371 (c)(1),
(2), (4) Date: Feb. 4, 2011

(87) PCT Pub. No.: WO2010/016015
PCT Pub. Date: Feb. 11, 2010

(65) Prior Publication Data
US 2011/0134131 A1    Jun. 9, 2011

(30) Foreign Application Priority Data

Aug. 6, 2008    (EP) .................................. 08161885

(51) Int. Cl.
*G09G 5/37*    (2006.01)
*G06F 15/80*    (2006.01)
*G06F 13/00*    (2006.01)
(Continued)

(52) U.S. Cl.
CPC .. *G06F 15/16* (2013.01); *G06T 1/20* (2013.01)
USPC ............................. 345/563; 345/505; 345/536

(58) Field of Classification Search
CPC ........... G06T 1/20; G06T 1/60; G06T 15/005; G06T 2210/52; G06T 5/393
USPC .......... 345/501, 502, 505, 530, 531, 536, 563
See application file for complete search history.

(56) References Cited

U.S. PATENT DOCUMENTS

| | | | |
|---|---|---|---|
| 5,535,291 A | | 7/1996 | Spencer et al. |
| 6,167,502 A | * | 12/2000 | Pechanek et al. ............... 712/15 |
| 6,173,388 B1 | * | 1/2001 | Abercrombie et al. ......... 712/22 |

(Continued)

FOREIGN PATENT DOCUMENTS

| | | |
|---|---|---|
| EP | 1686789 A1 | 8/2006 |
| GB | 2348972 A | 10/2000 |

(Continued)

OTHER PUBLICATIONS

Elliott, Duncan G., et al; "Computational RAM: Implementing Processors in Memory"; IEEE Design & Test of Computers, IEEE Service Center, New York, NY US, vol. 1 6, No. 1; pp. 32-41; (Jan. 1, 1999).

(Continued)

*Primary Examiner* — Joni Richer (57) ABSTRACT

A SIMD parallel processor is described comprising an array comprising processing elements, associated data storage components and access means configured to enable access to at least one of the data storage components associated with at least one of the processing elements; a control processor; memory control means configured to enable addressing of at least one of the access means for the control processor; and connecting means configured to connect the memory control means to the access means.

17 Claims, 5 Drawing Sheets

(51) Int. Cl.
*G06F 15/16* (2006.01)
*G06T 1/20* (2006.01)

(56) References Cited

U.S. PATENT DOCUMENTS

| | | | |
|---|---|---|---|
| 6,282,583 B1* | 8/2001 | Pincus et al. | 713/375 |
| 6,785,780 B1 | 8/2004 | Klein et al. | |
| 7,818,541 B2* | 10/2010 | Rhoades et al. | 712/22 |
| 2003/0174252 A1* | 9/2003 | Bellas et al. | 348/699 |
| 2004/0215927 A1 | 10/2004 | Beaumont | |
| 2005/0244076 A1 | 11/2005 | Ratakonda et al. | |
| 2007/0230586 A1* | 10/2007 | Shen et al. | 375/240.26 |
| 2010/0066901 A1 | 3/2010 | Abbo et al. | |

FOREIGN PATENT DOCUMENTS

| | | |
|---|---|---|
| WO | 03/100756 A2 | 12/2003 |
| WO | 2004/110053 A1 | 12/2004 |
| WO | 2006/027751 A1 | 3/2006 |
| WO | 2006/115627 A2 | 11/2006 |

OTHER PUBLICATIONS

Gokhale, Maya, et al; "Processing in Memory: The Terasys Massively Parallel PIM Array"; IEEE Computer Service Center, Los Alamitos, CA, US, vol. 28, No. 4; pp. 23-31 (Apr. 1995).

Mai, Ken, et al; "Smart Memories: A Modular Reconfigurable Architecture"; Proceedings of the 27 Intl Symp on Computer Arch, Vancouver, BC, CN; IEEE Comp. Soc., Los Alamitos, CA, US; pp. 161-171 (Jun. 10, 2000).

Abbo, Anteneh A., et al.; "Xetal-II: A 107 GOPS, 600mW Massively Parallel Processor for Video Scene Analysis"; IEEE Journal of Solid-State Circuits, IEEE USA, vol. 43, No. 1; pp. 192-201 (Jan. 2008).

International Search Report for Application PCT/IB2009/053406 (Sep. 28, 2009).

* cited by examiner

SIMD PARALLEL PROCESSOR ARCHITECTURE

FIELD OF THE INVENTION

The invention relates to the field of processor architectures for single instruction multiple data (SIMD) parallel processors.

BACKGROUND OF THE INVENTION

In the field of computer graphics processing it is often imperative to achieve a high level of data parallelism. That is because identical or similar operations regularly need to be performed on a large set of data. For example, the same operation or operations may need to be performed for each pixel of a computer graphic. With contemporary high computer graphic resolutions reaching thousands or even millions of pixels and the desire to avoid lags or delay, the advantage of parallelizing and thus speeding up graphics processing becomes readily apparent. A typical layout of parallel processors is characterized by the combination of a single, central control processor and an array of tiles, each comprising a fixed number of processing elements as well as shift registers and local frame memory associated to each processing element or group of processing elements. The tiles are usually arranged in a cascade, such that the input data is shifted down the line of registers until each tile has obtained its part of the input data in its shift registers. Each of the processing elements then executes an identical sequence of instructions operating on that data, with the local memory used for storing intermediate and temporary data. Each processing element will regularly also be able to access the data of neighboring processing elements or the data of processing elements of the same tile. Once the processing for this set of data is complete, the current data which is now the output data is shifted down the line to the output and new input data is shifted into the shift registers of the tiles. The role of the central control processor is to provide the identical instruction to each of the processing elements, to control the shifting operations and perform other global management functions of the parallel processor.

Because the same instruction is executed simultaneously in each processing element, even though the data used with this instruction may be different, it is not easily possible to manipulate the data for an individual pixel which is currently being processed by the parallel processing elements. Doing so may, however, be advantageous in a number of circumstances, for example when an individual pixel is known to be defective or in other way special beforehand. It may also be advantageous for marking or masking purposes to be able to modify the data for an individual pixel. This is particularly relevant for text and sprites as they are used in gaming applications, for example.

It is therefore an object of the invention to provide a parallel processor architecture which allows for manipulating the data for an individual pixel.

SUMMARY OF THE INVENTION

According to the invention there is provided a parallel processor comprising an array, which in turn comprises processing elements, data storage components associated with the processing components and access means which are configured to enable access to at least one of the data storage components associated with at least one of the processing elements. The parallel processor further comprises a control processor. The parallel processor moreover comprises memory control means configured to enable addressing of at least one of the access means for the control processor. The parallel processor moreover comprises connecting means configured to connect the memory control means to the access means.

Further a method is described for accessing image data of an individual pixel in a parallel processor, which parallel processor in turn comprises processing elements and associated data storage components. The method also comprises addressing a data storage component by a control processor connected to the data storage components.

The parallel processor may be an integrated circuit or part of an integrated circuit. The integrated circuit may be based on complementary metal-oxide-semiconductor (CMOS) technology. In particular, the parallel processor may be a part of a microcontroller further comprising other components, like for example memory, a clock or an oscillator, input or output components, modules for communication protocols, wireless communication receivers, analog to digital converters and other components implemented on integrated circuits.

The parallel processor may be comprised in a device used in the field of smart vision, smart cameras, computer and video gaming or surveillance. The parallel processor may also be comprised in a device used in an automotive.

The array may be a set of any number of individual modules, which may or may not be identical to each other, each comprising one or more processing elements, data storage components and access means. The individual modules comprised by the array may be arranged in a sequential order. In particular, they may be physically arranged in a tile pattern, in particular in a rectangular tile pattern. Each module, except for a first and a last module, may be connected to the module preceding it and to the module following it.

Each one of the processing elements may comprise any number of arithmetic logic units (ALUs). Each processing elements may be able to execute an instruction set which is a reduced instruction set computing (RISC) based instruction set. Each processing element may comprise an accumulator.

Each one of the data storage components may comprise registers, shift registers and memory. Each data storage component may be associated with one or more processing elements. A processing element may access a data storage component with which it is associated for reading data from the data storage component and for writing data to the data storage component.

According to the invention, the access means are configured to provide access to at least one of the data storage components to an entity outside the module comprising these access means. The access means may be addressed by an entity outside the module for providing write access and read access to the at least one data storage component. According to the invention, the access means are configured to provide access to at least one of the data storage components to the control processor.

The control processor may be a general processing unit (GPU) and may comprise any number of ALUs. The control processor may itself also be a microcontroller. The control processor may be configured to load instructions for the processing elements. The control processor may comprise memory, which memory in turn comprises the instruction to be loaded for the processing elements as well as instructions for the control processor itself. The control processor may be configured to control shifting of data into the data storage components. The control processor may be configured to control shifting of data out of the data storage components. The control processor may comprise an interface for output and for input. In particular, the control processor may comprise inter-integrated circuit (I2C) communication interface.

The memory control means comprised by the control processor may in turn comprise a general memory control unit (GMCU) which is configured to receive an address input from the control processor. The memory control means may further comprise row memory control units (RMCUs). The GMCU may select an RMCU depending on the received address. The RMCU may be configured to select an access means of the array depending on the address received from the GMCU. The memory control means may be configured to enable a read access or a write access from the control processor to the data storage component to which the access means provide a read access or a write access.

The connecting means may comprise electrical connections between the memory control means and the access means of the array. The connecting means may further comprise multiplexers and may comprise demultiplexers for enabling a connection between the memory control means and the access means of the array.

The data processed by the parallel processor may be any kind of data suited for parallel processing. In particular, the data processed by the parallel processor may be image data. The image data may be data of an arbitrary digital representation type and of an arbitrary resolution. The image data may thus be of an arbitrary size. The image data may be coded according to an arbitrary color model. In particular, the image data may be coded according to the RGB color model or the image data may be coded according to the CMYK color model. The image data may comprise an arbitrary number of bits per pixel. A pixel is a single point in a graphic image.

The access means may be configured to enable individual addressing of a data storage component. Thus, addressing a single data storage component thus may not affect any other data storage component.

The parallel processor may be configured to process image data and thus the access means may be configured to enable addressing of image data of an individual pixel in the data storage components. The image data of an individual pixel may be stored in a single data storage component or it may be stored in any number of data storage components. It may also be that the image data of more than one pixel is stored in a single data storage component. The access means may be configured to enable addressing the whole image data of an individual pixel without affecting the image data which is not of this pixel.

The access means may be configured to enable a read access to at least one of the data storage components associated to at least one of the processing elements. Thus the access means may be configured to enable for an entity outside the array a read access to the at least one of the data storage components associated to at least one of the processing elements.

The access means may be configured to enable a write access to at least one of the data storage components associated to at least one of the processing elements. Thus the access means may be configured to enable for an entity outside the array a write access to the at least one of the data storage components associated to at least one of the processing elements.

The write access to at least one of the data storage components may comprise at least one write mask mode. The at least one write mask mode may comprise at least one of setting individual bits and clearing remaining bits and setting individual bits and leaving other bits unchanged. A write mask mode of setting individual bits and clearing remaining bits sets one or more bits of the data at an address of at least one of the data storage components. There may be an arbitrary number of bits at the address of the at least one of the data storage components. An arbitrary set of bits of the bits at the address may be set to the same value as the corresponding bits of a given bit data. The remaining bits of the bits at the address may be cleared, that is given a logical value of zero. A write mask mode of setting individual bits and leaving other bits unchanged sets one or more bits of the data at an address of at least one of the data storage components. There may be an arbitrary number of bits at the address of the at least one of the data storage components. An arbitrary set of bits of the bits at the address may be set to the same value as the corresponding bits of a given bit data. The remaining bits of the bits at the address may remain unchanged, that is they retain their current logical value.

The data storage components may comprise shift registers and frame memory. The shift registers may comprise flip-flops which are cascaded in the array comprising the data storage components. There may be an arbitrary number of shift registers and the shift registers may have an arbitrary width in bits. The frame memory may have an arbitrary width in bits and is readable as well as writable. The memory may be implemented by flip-flips, by static random access memory (SRAM), by dynamic random access memory (DRAM) or by any other type of memory.

The access means may comprise a data buffer. The data buffer may also be a cache. The data buffer may be of any size and may be implemented by flips-flops, by SRAM, by DRAM or by any other type of memory. The data buffer may comprise a write buffer. The data buffer may comprise a read buffer. The write buffer may temporarily hold data to be written to the data storage components. The read buffer may temporarily hold data to be read from the data storage components. The data buffer may be brought into consistency with the data storage components in regular intervals or the data buffer may be brought into consistency with the data storage components when it is necessary.

The access means may be configured for enabling parallel write access and read access to the data buffer. The access means may be configured to enable for an entity outside the array a write access to the data buffer and simultaneously enable for an entity outside the array a read access to the data buffer.

The data buffer may be configured for data transfer from the data buffer to the frame memory. The data buffer may be configured for data transfer from the frame memory to the data buffer. The data transfer between the frame memory and the data buffer may occur with a granularity of the data of 8 pixels.

The access means may be configured for enabling write access to the data buffer, which write access may be a write through access to the frame memory. A write through access to the data buffer may cause the data written to the data buffer to be synchronously also written to the frame memory.

The access means may be configured for enabling read access to the data buffer, which read access may be a read through access to the frame memory. A read through access to the data buffer may cause reading the data from the frame memory and synchronously updating the read data in the data buffer.

The array comprising processing elements, associated data storage components and access means may be comprised by an array of tile elements, wherein each tile element comprises processing elements, data storage components and access means configured to enable access to at least one of the data storage components associated with at least one of the processing elements comprised by the tile element. A tile element is a block of a layout for an integrated circuit for forming a part of an integrated circuit. A tile element may comprise laid out circuit elements, for examples transistors. A tile element may comprise a given number and kind of processing elements, a certain number and kind of different data storage components and a certain number and kind of access means. A tile element may form a scalable block which may be duplicated in an integrated circuit any number of times and may have an interface adapted to interconnect with adjacent tile elements.

The memory control means may be configured for enabling data transfer between the data buffer and the frame memory for the array of tile elements in parallel. Thus the control processor may be configured to utilize the memory control means for a simultaneous data transfer to each data buffer in every tile element from the appropriate frame memory. The control processor may thus be configured to address all tile elements simultaneously. The simultaneous data transfer to each data buffer in all tile elements is possible because the transfer is internal to each tile element.

The memory control means may be configured to enable addressing a row of the array of tile elements. The tile elements may be laid out in a rectangular pattern with an arbitrary number of columns and rows of tile elements. The memory control means may be configured to enable a simultaneous addressing of a row of the array of tile elements. Simultaneous addressing of a row of the array of tile elements may enable the control processor to simultaneously access the data buffers of the tile elements of that row.

The memory control means and the access means may be configured for run-length encoding (RLE) and run-length decoding. The memory control means may reduce a number of given data bits by using RLE to arrive at a smaller number of bits representing the given data bits in coded form. The memory control means may also decode bits coded using RLE to arrive at the original given data bits. The access means may reduce a number of given data bits by using RLE to arrive at a smaller number of bits representing the given data bits in coded form. The access means may decode bits coded using RLE to arrive at the original given data bits. The RLE and the decoding of the RLE coded bits may be implemented in hardware in the memory control means and the access means. RLE may reduce the bandwidth needed for transfer of data between the memory control means and the access means.

The connecting means may be configured to transfer run-length encoded data. The connecting means may be configured to transfer RLE data from the memory control means to the access means. The connecting means may be configured to transfer RLE data from the access means to the memory control means.

The parallel processor may be a single instruction multiple data (SIMD) processor. The processing elements may each simultaneously execute the same instruction on respective different data. The instruction executed by the processing elements may be controlled by the control processor. The data on which the instruction is executed may be in the shift register and the frame memory associated to the respective processing element.

DETAILED DESCRIPTION OF THE DRAWINGS

Figure 1:
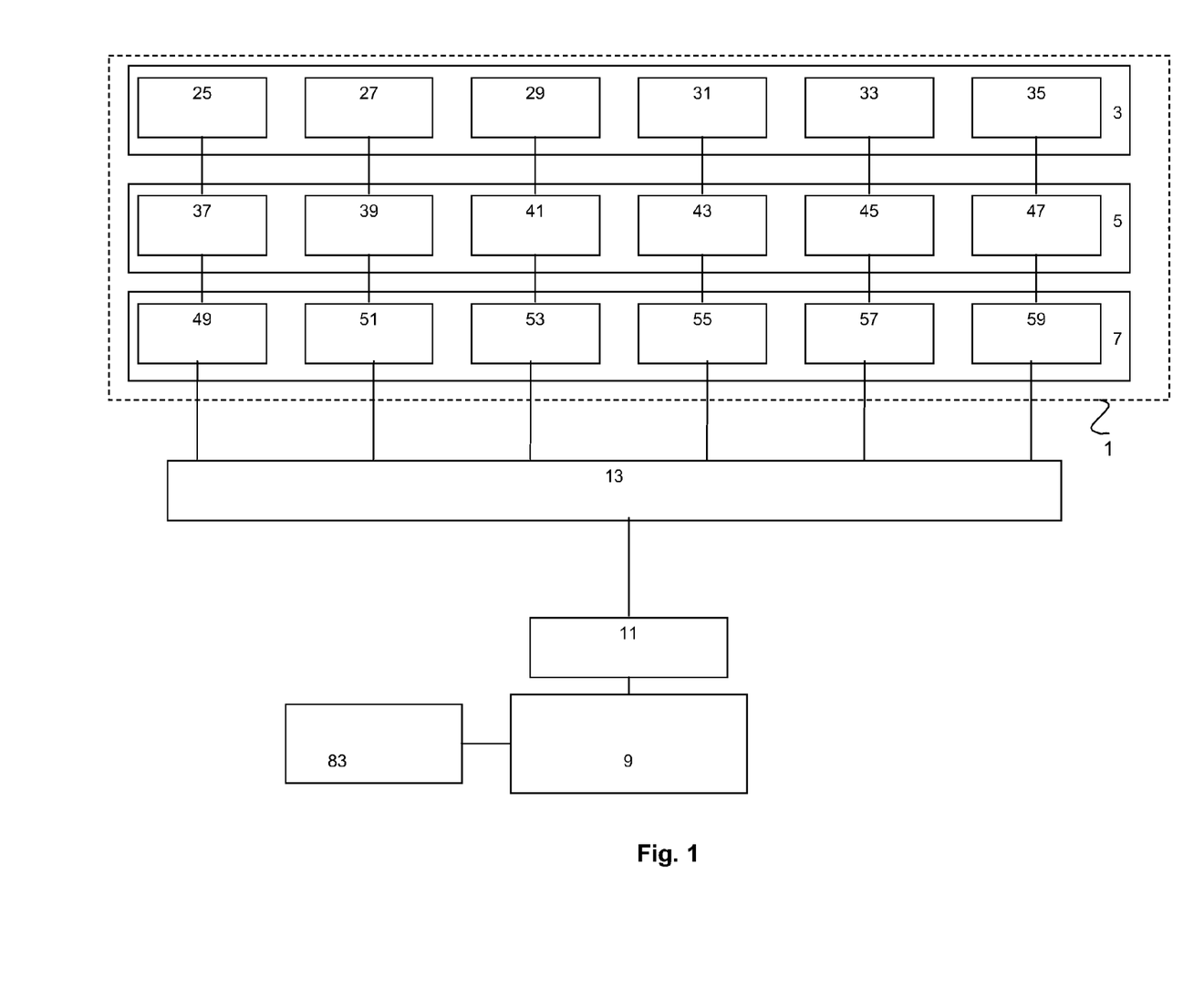
FIG. 1 is a schematic block diagram illustrating a parallel processor according to the invention.

FIG. 1 illustrates an exemplary parallel processor, in which an array 1 is connected to a control processor 9.

The array 1 comprises an array 3 processing elements 25, 27, 29, 31, 33, 35 as well as an array 5 of data storage components 37, 39, 41, 43, 45, 47 and an array 7 of access means 49, 51, 53, 55, 57, 59. Each data storage component 37, 39, 41, 43, 45, 47 is associated with a processing element 25, 27, 29, 31, 33, 35. Each access means 49, 51, 53, 55, 57, 59 is configured to enable access to one of the data storage components 37, 39, 41, 43, 45, 47.

The access means 49 is configured to enable access to the data storage component 37 associated with the processing element 25. The access means 51 is configured to enable access to the data storage component 39 associated with the processing element 27. The access means 53 is configured to enable access to the data storage component 41 associated with the processing element 29. The access means 55 is configured to enable access to the data storage component 43 associated with the processing element 31. The access means 57 is configured to enable access to the data storage component 45 associated with the processing element 33. The access means 59 is configured to enable access to the data storage component 47 associated with the processing element 35.

The exemplary parallel processor further comprises a control processor 9, presently a general purpose microcontroller. The control processor 9 is connected to local memory 83 and further to memory control means 11. The memory control means 11 are connected to the access means 49, 51, 53, 55, 57, 59 via the connecting means 13. The control processor 9 is running program code and using data from local memory 83 and may directly address any part of local memory 83 through a memory address access. According to the invention, the control processor 9 is also able to address any of the data storage components 37, 39, 41, 43, 45, 47 indirectly through the access means 49, 51, 53, 55, 57, 59, the memory control means 11 and the connecting means 13.

Depending on the memory address used by the control processor 9, the memory control means 11 determine which of the data storage components 37, 39, 41, 43, 45, 47 is to be accessed. By way of example, the control processor 9 uses the memory address with which to access data storage component 39. The memory control means 11 then determine that access means 51 are to be used and selects access means 51 via the connecting means 13. By way of example, the control processor 9 executes a write operation access to data storage component 39.

The memory control means 11 then use RLE to encode the data to be written and further cause a transmission of the RLE coded data via the connecting means 13 to the access means 51. Transmitting the data in an RLE coded format over the connecting means 13 uses less bandwidth than transmitting the data in an uncoded format. Thus, the layout area required for connecting means 13 configured to transmit the data in an RLE coded format is smaller than the layout area required for connecting means configured to transmit the same data in an uncoded format.

The access means 51 write the data into the appropriate part of the data storage component 39. The processing element 27 is now able to use the data written to data storage component 39.

As another example, the control processor 9 may also execute a read operation to data storage component 41. The memory control means then determine that access means 53 are to be used and select access means 53 via the connecting means 13. The access means 53 then read the data from the appropriate part of the data storage component 41 and use RLE to encode the data thus read. The RLE coded data is then transmitted from the access means 53 via the connection means 13 to the memory control means 11. Transmitting the data in an RLE coded format over the connecting means 13 uses less bandwidth than transmitting the data in an uncoded format. The memory control means 11 decode the RLE coded data and pass the decoded data to the control processor 9. The control processor 9 may now process the data or write it to local memory 83.

As an example, the parallel processor may be used for image processing. The data in each of the data storage components 37, 39, 41, 43, 45, 47 may correspond to the image data of a single pixel of the image. Then the control processor 9 can proceed as described to manipulate the image data of a single pixel. This is advantageous if for example it is known that the data of this single pixel is defective and needs to be corrected or masked. Masking a pixel of which the data is defective may entail setting the pixel to a predetermined value. For example, a defective pixel may be set to a value corresponding to a black pixel if it known to be defective. Alternatively, a defective pixel may be set to a value corresponding to a color interpolated from the colors of neighboring pixels. As another possibility, a defective pixel may be set to a value corresponding to a white color if the neighboring pixels are determined to have a light color and set to a value corresponding to a black color if the neighboring pixels are determined to have a dark color.

Figure 2:
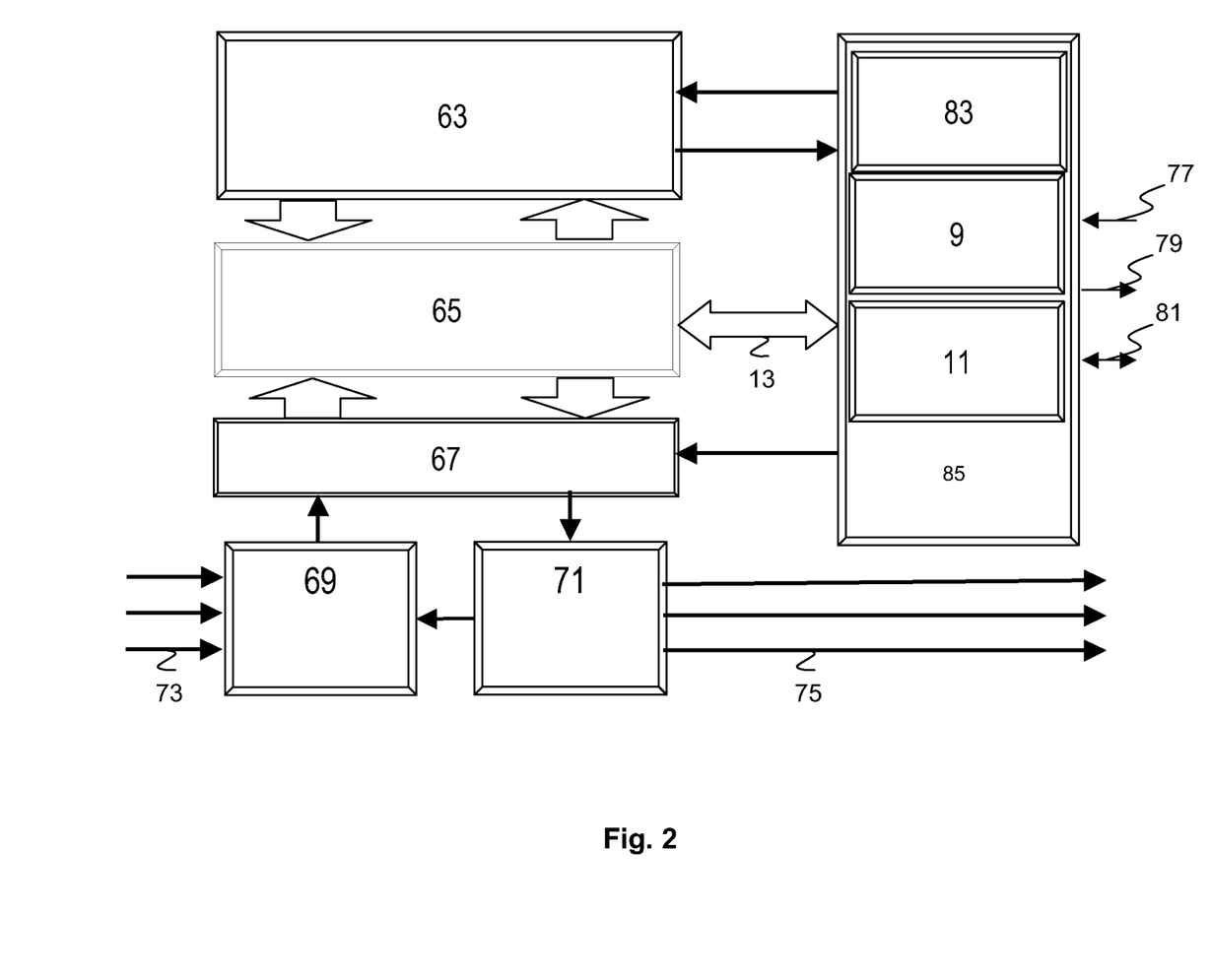
FIG. 2 is a schematic block diagram illustrating the integration of a parallel processor according to the invention in a system for image processing.

FIG. 2 schematically shows the use of a parallel processor according to the invention in a system for image processing.

The illustrated system comprises a global control block 85, which in turn comprises a control processor 9, a memory control unit 11 and local memory 83. The global control block 85 has an outside interface comprising a general purpose input interface 77 from which input may be received as well as a general purpose output interface 79 with which output may be sent. The global control block 85 further has an I2C communication interface 81 for sending and receiving data.

The illustrated system further comprises an input output (IO) shift register 67, a frame memory 65, a linear processor array 63, connecting means 13 connecting the global control block 85 with the frame memory 65 as well as a data input processor 69 configured to receive video input data 73 and a data output processor 71 configured to send video output data 75.

The linear processor array 63 consists of elements which are individual processors, in other words processing elements. Each processing element of the linear processor array 63 is associated with a portion of the frame memory 65 and a part of the IO shift register 67. Video input data 73 is received by a data input processor 69 and shifted into the IO shift register 67 when the control processor 9 gives a signal to start the processing of a new set of data. The shifting of the IO shift register 67 is also controlled by the control processor 9. The video input data 73 received by the data input processor 69 is shifted into the IO shift register 67 until the received video input data 73 completely fills the IO shift register 67.

Then processing of the data in the IO shift register 67 is started by the control processor 9. The elements of the linear processor array 63 all execute the same instruction supplied by the control processor 9 from local memory 83. While doing so, the elements of the linear processor array 63 are processing the data in the IO shift register 67 as well as the data in the frame memory 65. Intermediate results are saved in the frame memory 65 by the elements of the linear processor array 63. Each element of the linear processor array 63, i.e. each processing element, has access to the portion of the frame memory 65 with which it is associated and also the part of the IO shift register 67 with which it is associated. Moreover, each element of the linear processor array 63 has access to the portions of the frame memory 65 and the parts of the IO shift register 67 with which the preceding element of the linear processor array 63, i.e. the preceding processing element, and the following element of the linear processor array 63, i.e. the following processing element, is associated.

At any time during this processing, the control processor 9 may access the frame memory 65 with the means disclosed in FIG. 1, of which in FIG. 2 only the connecting means 13 are shown.

When the processing of the data in the IO shift register 67 is complete, the control processor 9 stops processing of the data by the elements of the linear processor array 63. The data in the IO shift register 67 is then shifted out of the IO shift register 67 under the control of the control processor 9 and sent as video output data 75 by the data output processor 71. Simultaneously, the next set of video input data 73 is shifted into the IO shift register 67 by the data input processor 69.

Figure 3:
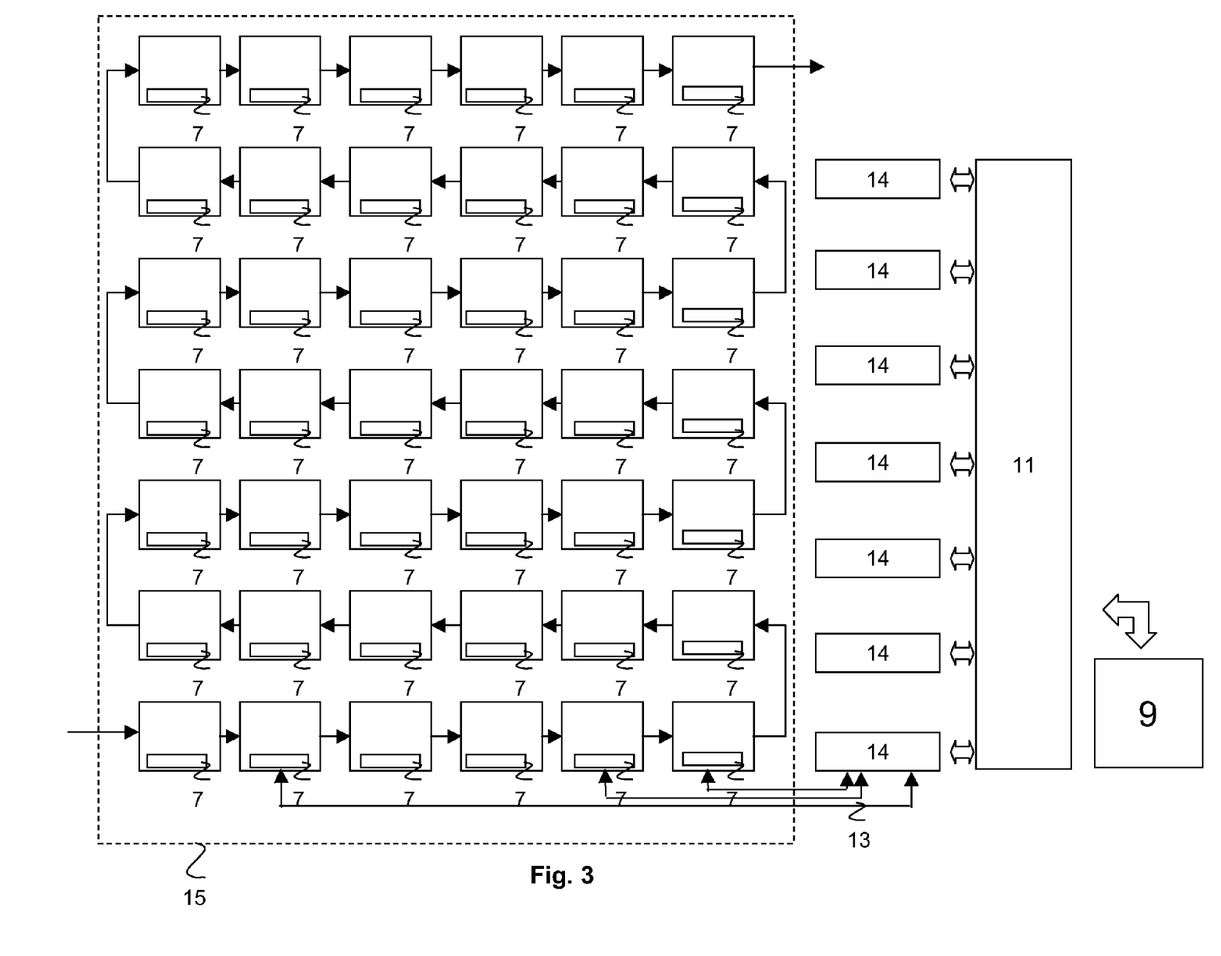
FIG. 3 is a schematic block diagram illustrating an arrangement of tile elements in a parallel processor according to the invention.

FIG. 3 displays an array 1 comprising an arrangement of an array 15 of tile elements which is connected to a control processor 9, presently a general purpose microcontroller, via memory control means 11 and connecting means 13. The array 15 of tile elements is laid out in a rectangular pattern. The connecting means 13 further comprise row addressing means 14 for each row of the rectangular layout of the tile elements of array 15. Each tile element is identical in internal layout and comprises processing elements, data storage components and access means. The data storage components comprise frame memory and an IO shift register, which are not separately shown. The access means of all tile elements of array 15 form an array 7 of access means. Each individual access means of the array 7 of access means is connected to an entity of the row addressing means 14 in the same fashion as depicted in FIG. 3 for the bottom row of the array 15 of tile elements. This connection is bi-directional, in other words it enables a read access as well as a write access to the data storage component of the respective tile element of the array 15 of tile elements. By way of example, the tile elements are interconnected such that they form a cascade in which input data may be shifted into the IO shift register of all tile elements by shifting into the shift register of the first tile element. In order to save layout area required for each tile element, the tile elements may be interconnected by means of field programmable gate array (FPGA)-like routing interconnect structures. Similarly and simultaneously, the output data may be shifted out of the shift register of all tile elements by shifting out of the shift register of the last tile element.

The control processor 9 may address the frame memory of any tile element from the array 15 of tile elements by accessing a particular access means from the array 7 of access means as described above. Moreover, each of the row addressing means 14 comprised by the connecting means 13 enables simultaneous addressing of all access means of the array 7 which are in a particular row of the rectangular layout of the array 15 of tile elements. Using these row addressing means 14, the control processor 9 is able to address the frame memory of all tile elements from the array 15 of tile elements that are in a particular row by accessing the access means from the array 7 of access means that are in that same row. Thus a simultaneous access to the frame memory of all tile elements in that row is enabled.

Figure 4:
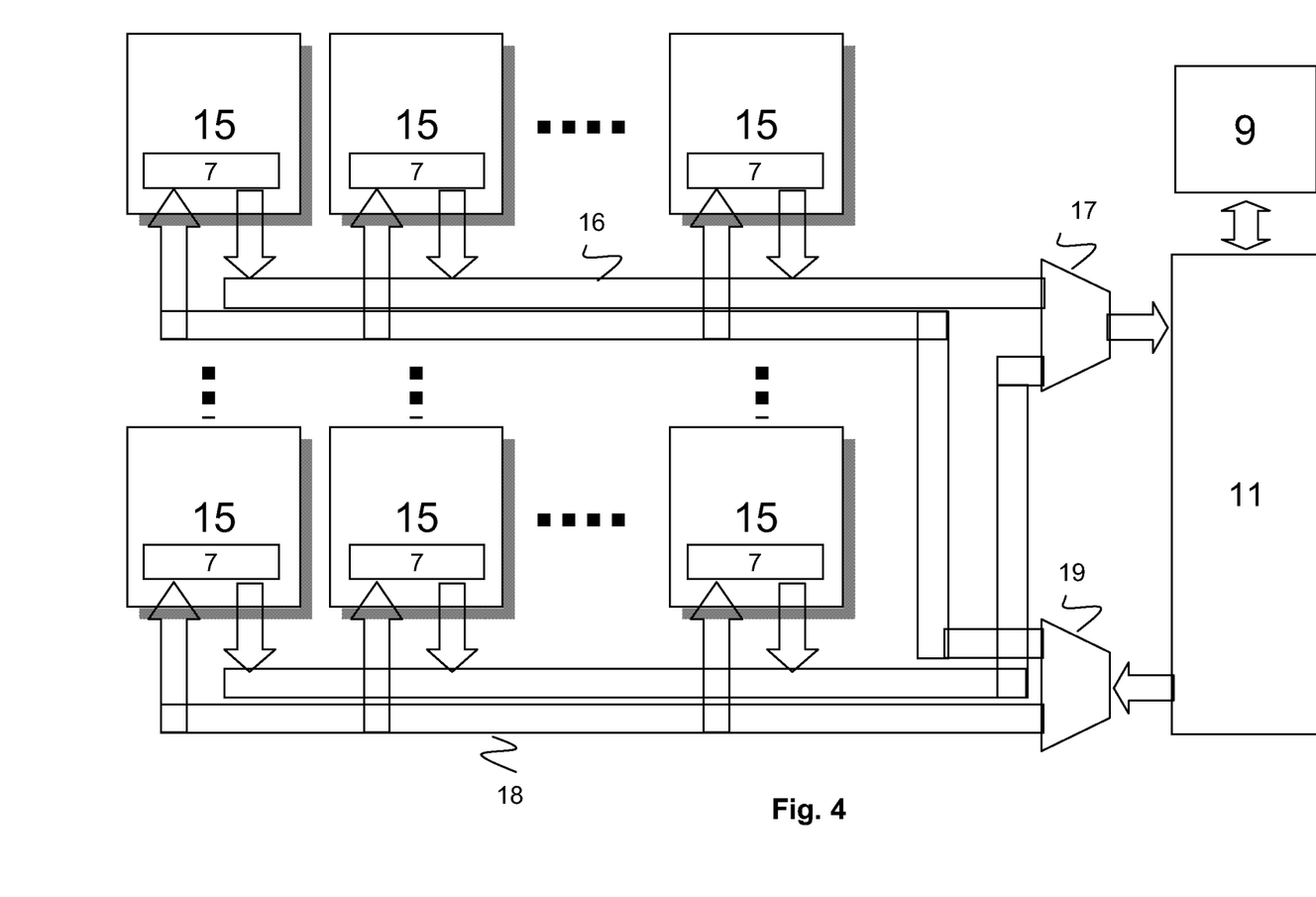
FIG. 4 is a schematic block diagram illustrating parallel write access and read access according to the invention.

FIG. 4 illustrates the parallel write and read access of a control processor 9, presently a general purpose microcontroller, to an array 15 of tile elements comprising an array 7 of access means.

The control processor 9 is connected to memory control means 11, which determine the routing for a write access to data storage components of the tile elements and also for a read access to data storage components of the tile elements as already described. The memory control means 11 are connected to the array 7 of access means via connecting means 13. The connecting means 13 comprise a multiplexer 17 and a demultiplexer 19. Furthermore, the connecting means 13 comprise separate lines with which to access different tile elements from the array 15 of tile elements. The connecting means 13 also comprise separate read lines 16 and write lines 18 as well as separate read and write ports with which to interface to each access means from the array 7 of access means.

For a write access, the memory control means 11 cause the demultiplexer 19 to select the write line 18 corresponding to the access means from the array 7 of access means which corresponds to the data storage component to which the data is to be written. Likewise for a read access, the memory control means 11 cause the multiplexer 17 to select the read line 16 corresponding to the access means from the array 7 of access means which corresponds to the data storage component from which the data is to be read. Because the multiplexer 17 and the demultiplexer 19 are distinct, separate and may select the respective read line 16 or write line 18 independently, a parallel read access and write access to the data storage components of different tile elements from the array of tile elements 15 is enabled.

In a further embodiment of the invention, in order to reduce layout area, only write access may be implemented, in which case the multiplexer 17 and the read line 16 of the connecting means 13, which are used exclusively for the read access, may be omitted.

In yet a further embodiment, also to reduce layout area, only read access may be implemented, in which case the demultiplexer 19 and the write line 18 of the connecting means 13, which are used exclusively for the write access, may be omitted.

Figure 5:
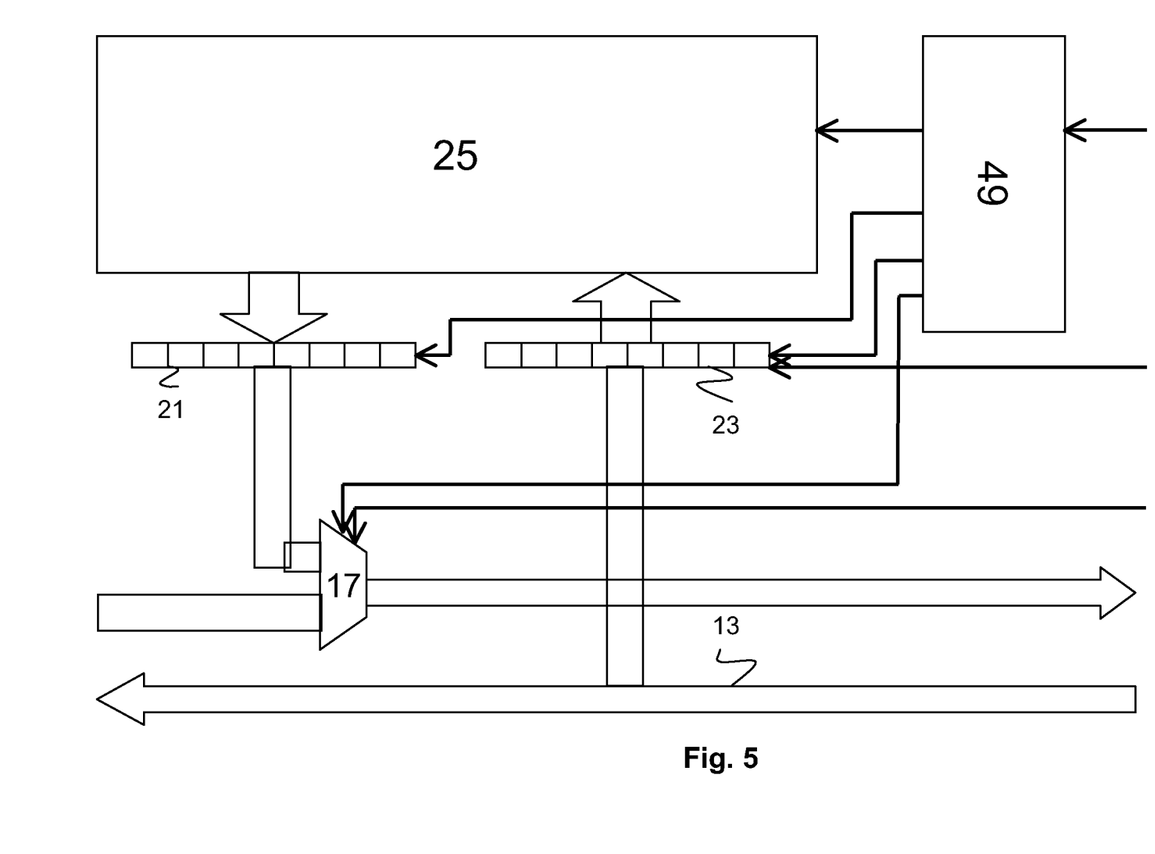
FIG. 5 is a schematic block diagram illustrating data buffers in a parallel processor according to the invention.

FIG. 5 illustrates the functioning of data buffers 21, 23 for accessing the data storage component 25 with access means 49.

The data storage component 25 is connected to a read buffer 21 as well as to a write buffer 23. The read buffer 21 and the write buffer 23 are also connected to connecting means 13, which comprise a multiplexer 17. The data storage component 25 is further connected to access means 49, which also control the operation of the read buffer 21 as well as the write buffer 23.

On a read operation as described previously, the read data may be transferred from the data storage component 25 to the read buffer 21 and from there further over the connecting means 13 and its multiplexer 17 to the control processor 9, which is not shown in FIG. 5. The data thus transferred to the read buffer 21 remains in the read buffer 21. On a read access to a different part of the same data storage component 25, it is overwritten. If a read access to the same part of the same data storage component 25 occurs before the read buffer 21 is overwritten, then the data is read from the read buffer 21 without transferring it anew from the data storage component 25 to the read buffer 21. The access means 49 may also determine that read access in a read through mode is requested. In that case overwriting the data in the read buffer 21 is forced, and a fresh transfer of data from the data storage component 25 to the read buffer 21 occurs before the data is further transferred via the connecting means 13. This occurs even if the data in the read buffer 21 is already identical to the new data to be read.

On a write operation as described previously, the data to be written may be transferred to the write buffer 23 from the control processor 9, which is not shown in FIG. 5, via the connecting means 13 and from there further to the data storage component 25. The data thus transferred to the write buffer 23 remains in the write buffer 23. On a write access to a different part of the same data storage component 25, it is overwritten. If a write access to the same part of the same data storage component 25 occurs before the write buffer is overwritten, then the data is written to the data storage component 25 from the write buffer 23 without transferring at anew from the control processor 9 via the connecting means 13. It may also be that there is no demultiplexer in the write direction of the connecting means 13. In that case, every write access over the connecting means writes all write buffers, not only the write buffer 23 of the data storage component 25. Thus a simultaneous write to all write buffers and a subsequent write to further data storage components without individual data transfers to the corresponding write buffers with the same data is possible.

The access means 49 may also determine that a write access in a write through mode is requested. In that case overwriting the data in the write buffer 23 is forced with a fresh transfer of data via the connecting means 13 to the write buffer 23 before the data storage component 25 is written with this data from the write buffer 23. This occurs even if the data in the write buffer 23 is already identical to the new data to be written. The access means 49 may further determine that a write access with a particular write mask mode is requested. In a first write mask mode, a selected number of bits of data of the data storage component 25 are set to the same value as the selected bits of the data in the write buffer 23 and the other bits are cleared to a logical value of zero. In a second write mask mode, a selected number of bits of data of the data storage component 25 are set to the same value as the selected bits of the data in the write buffer 23 and the other bits remain at their previous value.

What is claimed is:

1. Parallel processor comprising:
an array comprising processing elements, data storage components and access means;
a control processor;
memory control means configured to enable addressing of at least one of the access means of the array by the control processor; and
connecting means configured to connect the memory control means to at least one of the access means of the array;
wherein each access means is configured to enable write access to a single corresponding data storage components having a single corresponding processing element, and
wherein the write access to at least one of the data storage components comprises a write mask mode, wherein, if the access means determine that a first write mask mode is requested, the write mask mode comprises setting individual bits and clearing remaining bits and, if the access means determine that a second write mask mode is requested, the write mask mode comprises setting individual bits and leaving other bits unchanged.

2. Parallel processor according to claim 1, wherein the access means are configured to enable individual addressing of a data storage component.

3. Parallel processor according to claim 2, wherein the parallel processor is configured to process image data and the access means are configured to enable addressing of image data of an individual pixel in the data storage components.

4. Parallel processor according to claim 1, wherein the access means are configured to enable read access to at least one of the data storage components associated to at least one of the processing elements.

5. Parallel processor according to claim 1, wherein the data storage components comprise shift registers and frame memory.

6. Parallel processor according to claim 1, wherein the access means comprise a data buffer.

7. Parallel processor according to claim 6, wherein the access means are configured for enabling parallel write access and read access to the data buffer.

8. Parallel processor according to claim 6, wherein the data buffer is configured for data transfer to the frame memory and from the frame memory.

9. Parallel processor according to claim 8, wherein the access means are configured for enabling write access to the data buffer, which write access is a write through access to the frame memory.

10. Parallel processor according to claim 8, wherein the access means are configured for enabling read access to the data buffer, which read access is a read through access to the frame memory.

11. Parallel processor according to claim 6, wherein the array comprising processing elements, associated data storage components and access means is comprised by an array of tile elements, wherein each tile element comprises processing elements, data storage components and access means configured to enable access to at least one of the data storage components associated with at least one of the processing elements comprised by the tile element.

12. Parallel processor according to claim 11, wherein the memory control means are configured for enabling data transfer between the data buffer and the frame memory for the array of tile elements in parallel.

13. Parallel processor according to claim 11, wherein the memory control means are configured to enable addressing a row of the array of tile elements.

14. Parallel processor according to claim 13, wherein the connecting means are configured to transfer run-length encoded data.

15. Parallel processor according to claim 1, wherein the memory control means and the access means are configured for run-length encoding and run-length decoding.

16. Parallel processor according to claim 1, wherein the parallel processor is a single instruction multiple data processor.

17. Method for accessing image data of an individual pixel in a parallel processor, which parallel processor comprises an array of processing elements, each processing element associated with a single data storage component having a single access means, which method comprises addressing a data storage component by a control processor connected to the data storage component via the access means, which method comprises enabling write access to at least one data storage component, and wherein the write access to the data storage component comprises a write mask mode, wherein, if a first write mask mode is requested, the write mask mode comprises setting individual bits and clearing remaining bits and, if a second write mask mode is requested, the write mask mode comprises setting individual bits and leaving other bits unchanged.

* * * * *